April 7, 1970            D. J. BELKNAP            3,505,556
CYLINDRICAL MINIATURE INCANDESCENT LAMPS AND METHODS OF
MAKING THE SAME Filed July 8, 1966            3 Sheets-Sheet 1

INVENTOR
DONALD J. BELKNAP

BY *Shapiro and Shapiro*

ATTORNEYS

April 7, 1970    D. J. BELKNAP    3,505,556
CYLINDRICAL MINIATURE INCANDESCENT LAMPS AND METHODS OF MAKING THE SAME
Filed July 8, 1966    3 Sheets-Sheet 2
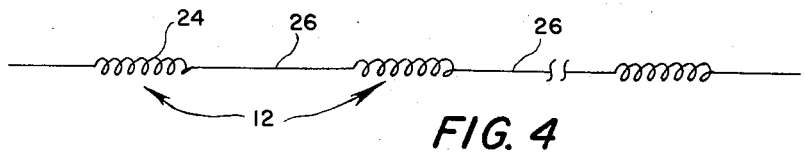
FIG. 4
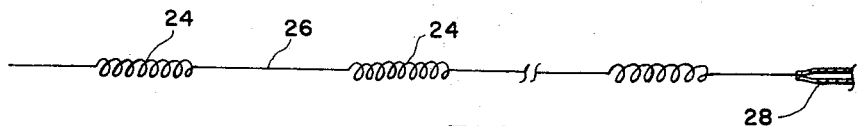
FIG. 5
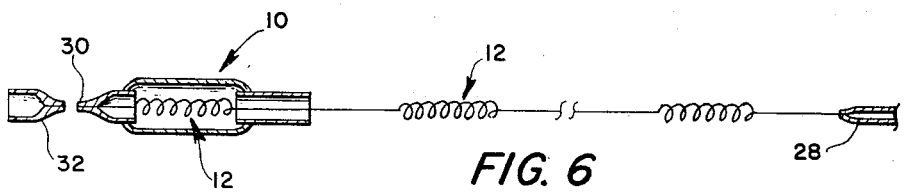
FIG. 6
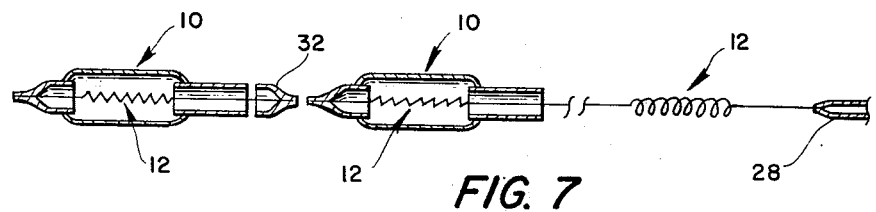
FIG. 7
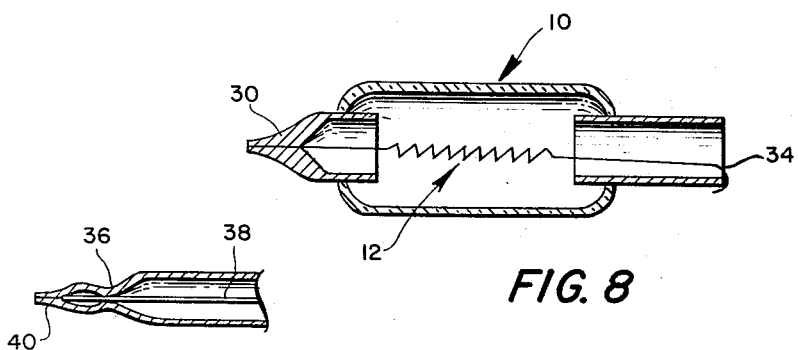
FIG. 8
FIG. 9
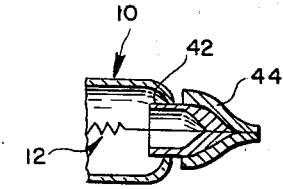
FIG. 10
INVENTOR
DONALD J. BELKNAP
BY Shapiro and Shapiro
ATTORNEYS April 7, 1970          D. J. BELKNAP          3,505,556
CYLINDRICAL MINIATURE INCANDESCENT LAMPS AND METHODS OF
MAKING THE SAME
Filed July 8, 1966          3 Sheets-Sheet 3
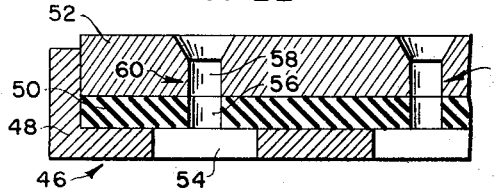
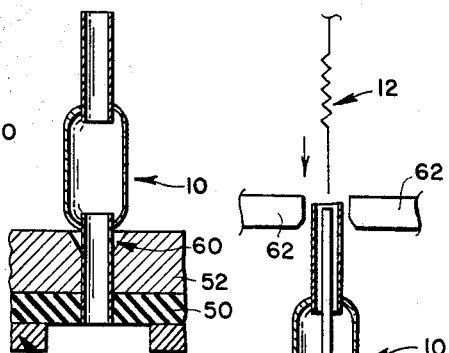
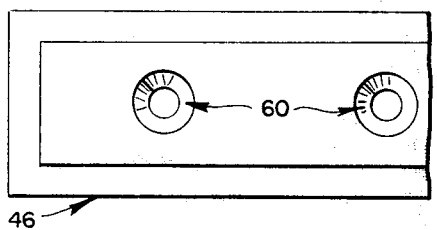
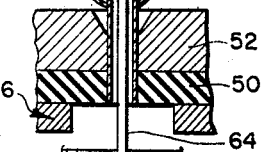
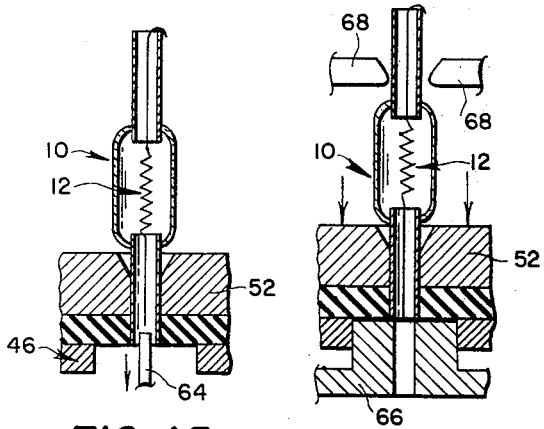
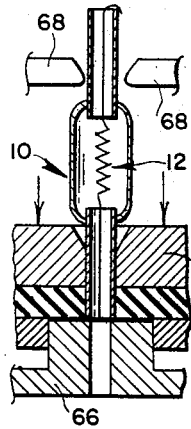
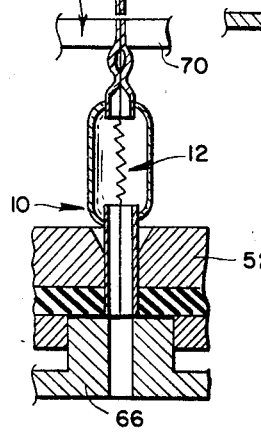
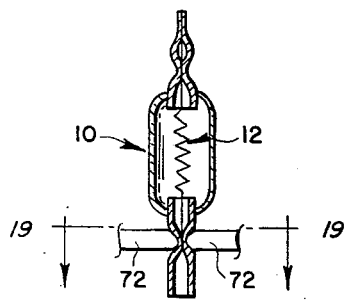
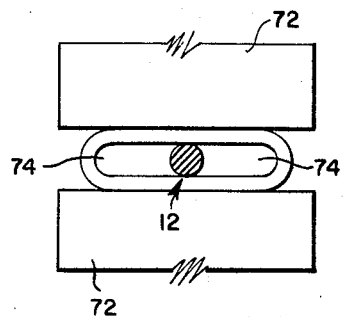
INVENTOR
DONALD J. BELKNAP
BY   *Shapiro and Shapiro*
ATTORNEYS United States Patent Office 3,505,556
Patented Apr. 7, 1970

3,505,556
CYLINDRICAL MINIATURE INCANDESCENT
LAMPS AND METHODS OF MAKING THE
SAME
Donald J. Belknap, 302 Patterson Court,
Takoma Park, Md. 20012
Filed July 8, 1966, Ser. No. 563,844
Int. Cl. H01j 5/50
U.S. Cl. 313—318                                    5 Claims

ABSTRACT OF THE DISCLOSURE

Microminiature incandescent lamp of axial geometry having a tubular envelope with a glass intermediate section and opposite metal end sections sealed to the ends of the glass section prior to assembly of the envelope with the filament of the lamp. The filament is inserted into the lamp through one of the end sections, and the end sections are sealed vacuum-tight by mechanical pinch-offs which grip the extremities of the filament. Methods of making the lamp, including the steps of filament insertion, evacuation, filament positioning, and envelope sealing are disclosed.

---

This invention relates to miniature incandescent lamps and the like, especially microminiature lamps having axial geometry, and to methods of making such devices.

The microminiature incandescent lamp described in the applicant's prior patents, Nos. 3,040,204; 3,193,906; and 3,226,218, have met the need for very small, low-current indicator lamps which are compatible in size with today's microminiature electronic circuitry. Although axial lamps of this type are now being manufactured, they are relatively expensive because of the need for hand labor and specialized techniques. Jigging is necessary in order to position properly and align the parts during assembly. Heat sealing the lamps within a vacuum environment, such as that produced in a bell jar, is inconvenient and results in somewhat reduced efficiency and shortened lifetime because of the trapping within the lamp envelope of gases liberated by the molten glass of the envelope at the time of sealing.

Other types of small incandescent lamps currently being manufactured do not require painstaking jigging and the inconvenience of bell jar sealing and are consequently less expensive. However, these lamps of a more conventional design usually have both leads projecting from the same end of the lamp and employ a glass tubulation for evacuating the envelope. This single-ended construction, as well as the need for protecting the tipped-off end of the glass tubulation with a metal cap or potting material, makes even the smallest of these lamps very much larger than the axial type lamps of the applicant's above-mentioned prior patents. In addition the conventional lamps suffer from reduction in efficiency and lifetime brought about by the evolution of gas during the final tip-off of the glass tubulation.

It is accordingly a principal object of the invention to provide improved incandescent lamps and the like and to provide improved methods of manufacturing such devices in order to overcome the foregoing and other problems and limitations.

Broadly, it is a principal object of the invention to provide microminiature lamps of smaller size, higher efficiency, longer lifetime, and lower cost and to provide improved methods of making such devices in order to attain these goals.

A further object of the invention is to provide a microminiature lamp construction and manufacturing methods in which the filament is aligned automatically without jigging.

Another object of the invention is to provide improved devices and methods for the foregoing purposes in which evacuation or gas filling of the devices is accomplished without the necessity for sealing the devices within a bell jar or the like.

A further object of the invention is to provide a simple incandescent lamp construction or the like readily adaptable to automatic machine production.

Still another object of the invention is to provide improved two-terminal devices having axial geometry and having very small physical size well suited for use in modern two-dimensional microcircuitry.

Yet another object of the invention is to provide small incandescent lamps or the like having a higher vacuum than that obtainable when glass is heated and fused to make the final seal.

A still further object of the invention is to provide improved devices of the foregoing type which are easily filled with a desired gas but are not contaminated by undesired gasses during sealing or tipping off.

Still another object of the invention is to provide improved methods of inserting and supporting filaments or the like, of retaining the same during manufacture, of evacuating, flushing, and gas filling envelopes, and of sealing envelopes without the application of heat.

An additional object of the invention is to provide improved terminal constructions and methods of making the same.

Briefly stated by way of example, the invention is concerned with a microminiature incandescent lamp of axial geometry and having a tubular envelope with a glass intermediate section and opposite metal end sections sealed to the glass section prior to assembly of the envelope with the filament of the lamp. The filament is inserted into the envelope through one of the end sections, and the extremities of the filament are located within the end sections. One of the end sections is then pinched off in a cold-welding operation to grip the corresponding extremity of the filament and to make a vacuum-tight seal. The envelope is evacuated through the other end section, which then is similarly pinched off to grip the corresponding extremity of the filament and to form another vacuum-tight seal.

The foregoing and other objects, advantages, and features of the invention and the manner in which the same are accomplished will become more readily apparent upon consideration of the following detailed description of the invention taken in conjunction with the accompanying drawings, which illustrate preferred and exemplary embodiments, and wherein:

FIGURE 4 is a plan view of a series of lamp filaments formed continuously from a length of wire in accordance with one step of a method of the invention;

FIGURE 5 is a a similar view illustrating the addition of a threading "needle";

FIGURE 6 is a similar view illustrating the threading of an envelope over the length of wire and the pinching off of the leading end;

FIGURE 7 is a similar view illustrating the threading of another envelope over the length of wire and the pinching off of the leading end;

FIGURE 8 is a longitudinal sectional view illustrating a separated envelope-filament unit;

FIGURE 9 is a fragmentary longitudinal sectional view of a terminal construction in accordance with the invention;

FIGURE 10 is a fragmentary longitudinal sectional view illustrating a modified form of pinch-off;

FIGURE 11 is a fragmentary vertical sectional view of a mounting block employed in accordance with one concept of the invention;

FIGURE 12 is a fragmentary plan view of the block;

FIGURE 13 is a vertical sectional view illustrating the mounting of an envelope in the block;

FIGURE 14 is a similar view illustrating the use of guide members and the insertion of a filament;

FIGURE 15 is a similar view illustrating the supporting of the filament;

FIGURE 16 is a similar view illustrating the placement of the mounting block upon a vacuum manifold and the commencement of a preliminary indenting operation at one end of the envelope;

FIGURE 17 is a similar view illustrating a pinch-off step;

FIGURE 18 is a similar view illustrating an indenting step at the opposite end of the lamp; and FIGURE 19 is a sectional view taken along line 19—19 of FIGURE 18.

Figure 1:
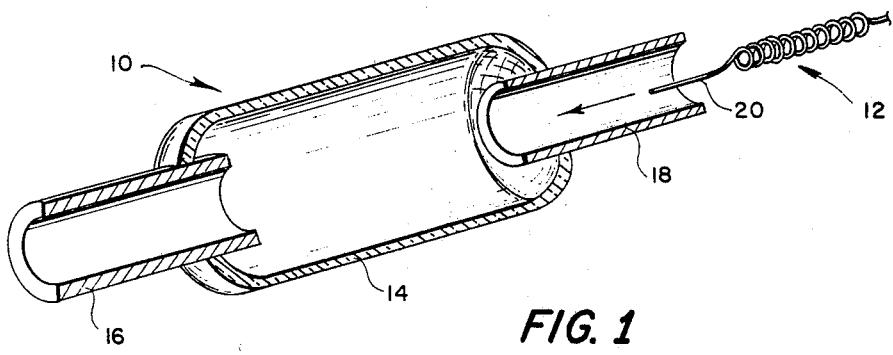
FIGURE 1 is a perspective longitudinal sectional view illustrating the insertion of a filament into an envelope in accordance with the invention.
Figure 2:
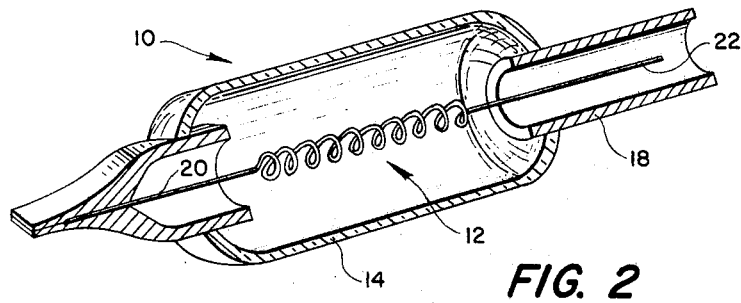
FIGURE 2 is a similar view illustrating the pinch-off at one end of the envelope.
Figure 3:
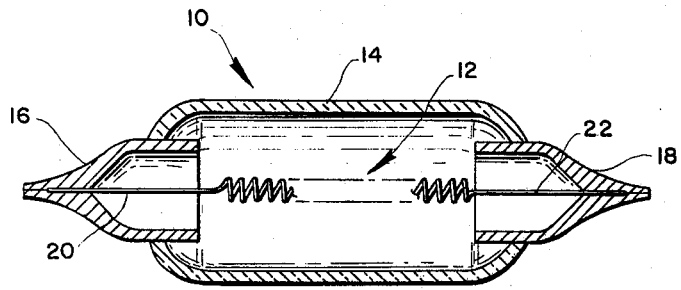
FIGURE 3 is a longitudinal sectional view illustrating a lamp construction of the invention with both pinch-offs completed.

Referring to the drawings, and initially to FIGURES 1–3, an incandescent lamp constructed in accordance with a fundamental concept of the invention comprises two basic parts—an envelope 10 and a filament 12. The envelope has a main, intermediate or central section 14, preferably of glass or ceramic tubing, and a pair of end sections 16 and 18, preferably of metal tubing. For example, the glass section may be formed of 7052 or lead glass, while the metal sections may be formed of Kovar or platinum. The metal sections extend from opposite ends of the glass section in alignment and are hermetically sealed to the ends of the glass tubing by conventional glass-to-metal seals. Such glass-to-metal or ceramic-to-metal seal units are manufactured by Glass-Tite Manufacturing, 725 Branch Ave., Providence, R.I., and by Carpenter Steel Company, 130 W. Bern St., Reading, Pa. A typical envelope for a microminiature incandescent lamp and may have a central section .05″ long with 0.025″ O.D. and 3 mil wall thickness and end sections 16, 18. .025″ long with .015″ O.D. and .010″ I.D. The filament 12 may be of the type described in the applicant's aforementioned prior patents, for example 25 to 30 turns of .00025″ diameter tungsten wire wound on a 0.001″ diameter mandrel.

To assemble the filament and the envelope, the filament is inserted through one end of the preformed envelope, as indicated in FIGURE 1, until its lead extremities 20 and 22 are located in the end sections 16 and 18 of the envelope. One end section, such as 16, is then pinched off with an appropriate tool, to grip the corresponding extremity 20 of the filament and to form a hermetic (vacuum-tight or gas-tight) seal. The pinch-off is formed by a cold-welding operation, that is, by the application of pressure without additional heat. Soft metals, such as fully annealed aluminum, .070″ O.D. x .010 wall Kovar, annealed nickel, thin-wall 52 alloy and platinum are typical materials which can be pinched off in this manner. Suitable tools for this operation are manufactured by CHA Industries, 1215 Chrysler Drive, Menlo Park, Calif.

The lamp is evacuated through the open end 18, which is then pinched off in the same manner as end 16, to grip the extremity 22 of the filament and to form another hermetic seal. This completes the lamp construction. The lamp can be placed in a spring clip to hold the lamp and provide end connections, or leads can be soldered to the metal ends.

In production, a large quantity of metal-glass envelopes can be produced in one or more standard sizes. Filaments of appropriate wire diameter and number of turns can be machine-wound on appropriate mandrels and spooled in long lengths of wire with alternate helixes 24 and straight sections 26 as shown in FIGURE 4. A convenient length of filament wire can be cut off from the spool and a short length of metal tubing 28 attached to one end by pinching, as shown in FIGURE 5, to provide a threading needle.

A metal-glass envelope 10 is then threaded over the needle and the filament wire pulled through until the envelope reaches the other end of the wire and is located so as to contain a corresponding filament 12. The leading end of the envelope is then pinched off at an intermediate region 30 of the metal tubing, and the severed portion 32 resulting from the cold-welding operation is discarded. The filament within the envelope thus has one of its ends held by an end section of the envelope which has been hermetically sealed by the pinch-off operation.

A second metal-glass envelope is threaded over the needle until it is located so as to surround the next filament and has its leading end pinched off as shown in FIGURE 7. This process can be continued until all helixes have been encased in envelopes with one end pinched off. Each of the short pinched off tips 32 of the adjacent envelopes can be clipped off and discarded. There thus results a plurality of envelopes with internal filaments attached at one end. If the filaments are not sufficiently well centered, the free end can be pulled slightly and bent over the open end of the envelope as shown at 34 in FIGURE 8.

Instead of forming the leading end pinch-offs one-by-one, a series of envelopes (either separate or with successive glass sections joined to common intermediate metal sections) may be threaded onto a length of filament wire until each of the filaments is encased by an envelope, and then the leading end pinch-offs may be formed concurrently.

The envelope-filament units are now ready to be evacuated and completely sealed.

Under certain circumstances, as for example when extremely fine wire filaments are used, an intermittent contact between the filament lead and the inner edge of the end section tubing may occur, producing fluctuation in both voltage drop and temperature gradient along the length of lead contained within the tubing. This can be avoided by employing filaments having short larger diameter leads of nickel or other suitable wire attached to them. The filaments can be skip-wound or not, as desired, and can be mechanically clamped to the leads or spot welded to them.

If there is a substantial disparity between the O.D. of the filament leads and the I.D. of the end sections of the envelope, for example when the end sections are formed of platinum tubing .032″ O.D. and .020″ I.D. and the filament leads are nickel wire .005″ in diameter, the filament may not be gripped securely by the pinch-off. Where the disparity is not as great (for example, with 0.015″ wire) this problem does not exist.

Where the disparity exists, the problem can be avoided by making an indentation in the end section tubing, as shown at 36 in FIGURE 9, to grip the lead wire 38 at an intermediate region, and then a pinch-off may be made beyond the indentation, as at 40, to form the hermetic seal. The indentation may be formed by placing a suitable spacer between the jaws of the pinch-off tool in order to restrict the occlusion of the jaws.

Another solution is illustrated in FIGURE 10. The wall thickness of tubing required for a reliable vacuum-tight pinch-off precludes a simple pinch-off very close to the glass-to-metal seal. In FIGURE 10 a thinner wall tubing 42 is employed, thereby enabling the tubing to be pinched off closer to the glass-to-metal seal without introducing strain which might break the seal, and also reducing the cost if precious metal tubing is employed. A relatively thick wall collar 44 of inexpensive metal is slipped over the tubing, and both the collar and the tubing are pinched off together. The collar may have an inner diameter substantially the same as the outer diameter of the tubing but has a substantially thicker wall, for example .006 inches.

FIGURES 11-19 illustrate an automatic machine assembly method of the invention. Basic metal mounting blocks 46 may be employed to hold and assemble the lamps. If lamps are spaced ten to the inch along a block, a ten inch block will hold a row of one-hundred lamps, for example. Such a block can be moved along in steps equal to the spacing between lamps or rows of lamps, with different operations of assembly being performed at each of several stops or stations. A section of a typical block 46 is shown in FIGURES 11 and 12, the block having a metal base plate 48, a layer 50 of resilient material, such as neoprene rubber, and a metal backing plate 52. The base plate has a plurality of openings 54 adapted to fit over the nipples of a vacuum manifold. Openings 56 in the resilient layer and flared openings 58 in the backing plate are aligned with corresponding openings 54 of the base plate to form receptacles 60 for the lamp units.

Typical manufacturing steps are shown in FIGURES 13-18. In FIGURE 13 an envelope 10 is inserted in a receptacle 60 of the block, being held upright and resting upon a flat surface at the bottom, for example. If desired, the top of the envelope may be accurately positioned by apertures in a guide plate 62 brought down over the envelopes as shown in FIGURE 14. A thin-wall guide tube 64 may be pushed up into the envelope from below, and a filament 12 provided with a hook at one end may be inserted into the guide tube from above. Then the positioning fixtures are removed and the filament left hanging as shown in FIGURE 15. If the filament has relatively heavy end leads, the weight of the leads can ensure that the filament hangs straight from the hook without appreciable stretching.

The entire block may next be placed on a pumping system, the nipple 66 of a typical underlying vacuum manifold being shown in FIGURE 16. The diameter of the opening in the nipples may be less than the diameter of the lower tubulations of the envelopes so that the envelopes are pushed upwardly as the nipples enter the openings 54 in the base plate to engage the lower surface of the resilient layer 50. Pressure is applied to the backing plate 52 to flatten the resilient layer and make a vacuum-tight seal about the lower tubulations.

If desired, the lamps may be baked out during evacuation by appropriate heater means. Also, the lamps may be flushed with an inert gas, such as argon or nitrogen, by introducing the gas through the vacuum manifold. While a purging gas is being forced through the lamps, the upper tubulations may be indented by the jaws 68 in FIGURE 16, as described with respect to FIGURE 9, to hold the corresponding filament leads securely. Then the upper tubulations are pinched off by the jaws 70 as shown in FIGURE 17.

The lamps are evacuated or gas filled through the lower tubulations. If desired, the filaments may be flashed to degas them before the final pinch-off. This can be done by applying a voltage between the upper pinch-off tool and a tool having jaws 72 for forming an indentation in the lower tubulation as shown in FIGURE 18.

The upper and lower indentations flatten the tubulations as shown in FIGURE 19, gripping the filament leads but leaving space 74 adjacent to the leads to permit gas to pass through the tubulations prior to pinch-off. If separate indentations are not required to grip the leads, the pinch-off tools themselves may nevertheless form a preliminary indentation to permit the passage of gas through the tubulations, and the jaws of the pinch-off tools may then be brought more closely together to provide a pinch-off at the same location as the indentations.

Instead of inserting the filaments while the envelopes are mounted on the block, enveolope-filament assemblies of the type shown in FIGURE 8 may be mounted on the block, evacuated, etc., and then pinched off at the lower tubulations.

After pinching off of the lower tubulations, the lamps can be dropped onto a conveyor belt, which may have slots to position the lamps, so that they may be brought between a pair of electrical contacts and tested by application of a preselected voltage. If the lamp current falls within a predetermined range, the lamp is good and can be passed on. Otherwise, the lamp is rejected and diverted.

The foregoing microlamp construction and method offers several advantages over prior constructions and methods:

(1) There are only two basic parts to the lamp, which can be machine-produced inexpensively in large quantities.

(2) Neither jigging nor bell-jar sealing is required.

(3) A minimum of hand labor is required, amounting perhaps only to the threading of the filament through the envelopes and placing the lamp units on the manifold.

(4) The lamps are less expensive than those previously produced and hence are available for a wide variety of applications, such as model cars, trains, toys, games, inexpensive jewelry, pen or pencil lights, key lights, etc.

(5) A thicker glass envelope (thicker wall) can be used than is possible with bell-jar sealing, making a more rugged lamp.

(6) Standard envelope sizes can be used for standard spring clips or leads can be soldered to the ends.

(7) The trapping of gas inside the envelope, associated with bell-jar sealing, and gas contamination produced during heat sealing are completely eliminated. Thus a higher vacuum can be obtained, with resultant longer life.

(8) If desired, inert gasses can easily be introduced into the lamp while the lamps are on the manifold, further to increase lamp life.

While preferred embodiments of the invention have been shown and described, it will be apparent to those skilled in the art that changes can be made in these embodiments, without departing from the principles and spirit of the invention, the scope of which is defined in the appended claims. For example, certain principles of the invention may be applied to devices other than incandescent lamps. Accordingly, the foregoing embodiments are to be considered illustrative, rather than restrictive of the invention, and those modifications which come within the meaning and range of equivalents of the claims are to be included therein.

The invention claimed is:

1. An incandescent lamp device and the like, comprising a tubular envelope having a main intermediate section of insulating material and a pair of conductive end sections, said main intermediate section being substantially cylindrical, having an inner diameter substantially greater than the thickness of its wall, and having a length substantially greater than its outer diameter, the wall thickness measured perpendicular to the length of said main intermediate section being substantially uniform throughout the major portion of the length of said main intermediate section, said end sections being sealed to the ends of said main intermediate section and being made of a deformable material, and a filament contained within said envelope and having extremities extending into said end sections, said end sections being permanently sealed remote from said main intermediate section by cold-weld vacuum-tight pinch-offs gripping the corresponding extremities of said filament, the internal cross-dimensions of said end sections of said envelope in undeformed state being greater than the external cross-dimensions of said filament, whereby said filament may be passed axially into said envelope before said envelope end sections are deformed.

2. The device of claim 1, said extremities being gripped by indentations in said end sections between said pinch-offs and said main intermediate section.

3. The device of claim 1, said element having a helical main portion and elongated extremities.

4. The device of claim 1, each of said end sections comprising a thin-wall conductive sleeve sealed to the main intermediate section and surrounded by a relatively thick-wall sleeve, said pinch-offs being provided jointly in the sleeves of said end sections.

5. The device of claim 1, wherein said lamp is a microminiature lamp having an evacuated envelope with a transparent glass main intermediate section and cylindrical metal end sections.

References Cited

UNITED STATES PATENTS

| | | | |
|---|---|---|---|
| 1,657,208 | 1/1928 | Greaves | 29—470.1 |
| 2,362,175 | 11/1944 | Swanson | 313—315 X |
| 3,040,204 | 6/1962 | Belknap | 313—315 |
| 3,090,116 | 5/1963 | Burgess | 29—470.1 |
| 3,141,225 | 7/1964 | Watson | 29—470.1 X |
| 3,191,276 | 6/1965 | Gwyn | 29—470.1 X |
| 3,336,433 | 8/1967 | Johnson et al. | 29—470.1 X |
| 2,521,315 | 9/1950 | Victoreen | 313—290 X |
| 3,275,879 | 9/1966 | Demarest et al. | 313—222 X |
| 2,135,690 | 11/1938 | Addink et al. | 313—25 X |
| 2,154,542 | 4/1939 | Swanson | 313—25 X |
| 2,222,093 | 11/1940 | Swanson | 313—271 X |
| 2,380,811 | 7/1945 | Walker | 313—317 X |
| 2,449,650 | 9/1948 | Greiner | 313—271 |
| 2,191,346 | 2/1940 | Greiner | 313—318 X |

JOHN W. HUCKERT, Primary Examiner

A. J. JAMES, Assistant Examiner

U.S. Cl. X.R.

313—317, 315, 331; 29—470.1